United States Patent
Soumpholphakdy et al.

(10) Patent No.: US 12,541,434 B2
(45) Date of Patent: Feb. 3, 2026

(54) VOLUME REPLACEMENT USING CLOUD VOLUME SNAPSHOTS

(71) Applicant: Dell Products L.P., Round Rock, TX (US)

(72) Inventors: Steven Soumpholphakdy, Chicago, IL (US); Daniel Ryan, Minneapolis, MN (US)

(73) Assignee: DELL PRODUCTS L.P., Round Rock, TX (US)

( * ) Notice: Subject to any disclaimer, the term of this patent is extended or adjusted under 35 U.S.C. 154(b) by 64 days.

(21) Appl. No.: 18/436,669

(22) Filed: Feb. 8, 2024

(65) Prior Publication Data

US 2025/0258739 A1    Aug. 14, 2025

(51) Int. Cl.
*G06F 11/14*    (2006.01)

(52) U.S. Cl.
CPC ...... *G06F 11/1451* (2013.01); *G06F 11/1453* (2013.01); *G06F 11/1464* (2013.01)

(58) Field of Classification Search
CPC ... G06F 11/14; G06F 11/1451; G06F 11/1453
See application file for complete search history.

(56) References Cited

U.S. PATENT DOCUMENTS

| | | | | |
|---|---|---|---|---|
| 11,853,785 | B1* | 12/2023 | Tsai | G06F 9/45558 |
| 11,907,163 | B1* | 2/2024 | Malamud | G06F 16/128 |
| 2012/0036161 | A1* | 2/2012 | Lacapra | G06F 16/13 |
| | | | | 707/781 |
| 2016/0048435 | A1* | 2/2016 | Blea | G06F 11/2069 |
| | | | | 714/6.3 |
| 2016/0239386 | A1* | 8/2016 | Huber | G06F 11/079 |
| 2020/0034077 | A1* | 1/2020 | Haravu | G06F 3/067 |
| 2020/0409803 | A1* | 12/2020 | Naidu | G06F 11/1484 |
| 2023/0273861 | A1* | 8/2023 | Nazari | G06F 11/1451 |
| | | | | 714/20 |
| 2023/0385166 | A1* | 11/2023 | Pawar | G06F 11/2025 |
| 2024/0211357 | A1* | 6/2024 | Gunasekaran | G06F 16/128 |
| 2024/0211434 | A1* | 6/2024 | Gunasekaran | G06F 11/1451 |
| 2024/0232133 | A9* | 7/2024 | Shaw | G06F 16/128 |

* cited by examiner

*Primary Examiner* — Kamini B Patel
(74) *Attorney, Agent, or Firm* — Amin, Turocy & Watson, LLP (57) ABSTRACT

A method facilitating volume replacement using cloud volume snapshots includes halting, by a system including at least one processor, input/output (I/O) activity to a first volume of a cloud computing system in response to the first volume being determined to be unreachable; obtaining, by the system, a snapshot of the first volume in response to the halting; and creating, by the system, a second volume, of the cloud computing system and other than the first volume, using the snapshot.

20 Claims, 10 Drawing Sheets

VOLUME REPLACEMENT USING CLOUD VOLUME SNAPSHOTS

BACKGROUND

In a cloud computing deployment that utilizes a clustered file system, computing clusters can be formed of similarly configured physical or virtual computing machines, and each machine in a given cluster can have one or more (real or virtual) attached storage drives or volumes. Additionally, respective machines and/or their attached drives can be interconnected via backend networking to enable communication between respective devices of the cluster. In such an implementation, it is desirable to facilitate techniques in which failures of storage volumes and/or other connected equipment can be remedied in an efficient manner.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include a memory that stores executable components and a processor that executes the executable components stored in the memory. The executable components can include a volume suspension component that suspends input/output (I/O) operations to a first volume of a cloud computing system in response to the first volume being determined to have become unresponsive. The executable components can further include a snapshotting component that captures a snapshot of the first volume in response to the volume suspension component suspending the I/O operations to the first volume. The executable components can additionally include a volume cloning component that creates a second volume, of the cloud computing system and not the first volume, using the snapshot of the first volume.

In another implementation, a method is described herein. The method can include halting, by a system including at least one processor, I/O activity to a first volume of a cloud computing system in response to the first volume being determined to be unreachable. The method can also include obtaining, by the system, a snapshot of the first volume in response to the halting. The method can further include creating, by the system, a second volume, of the cloud computing system and other than the first volume, using the snapshot.

In an additional implementation, a non-transitory machine-readable medium is described herein that can include instructions that, when executed by a processor, facilitate performance of operations. The operations can include suspending I/O operations to a first cloud system volume in response to detecting a failure associated with the first cloud system volume; obtaining, in response to the suspending, a snapshot of the first cloud system volume; and creating a second cloud system volume, distinct from the first cloud system volume, based on the snapshot.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Figure 1:
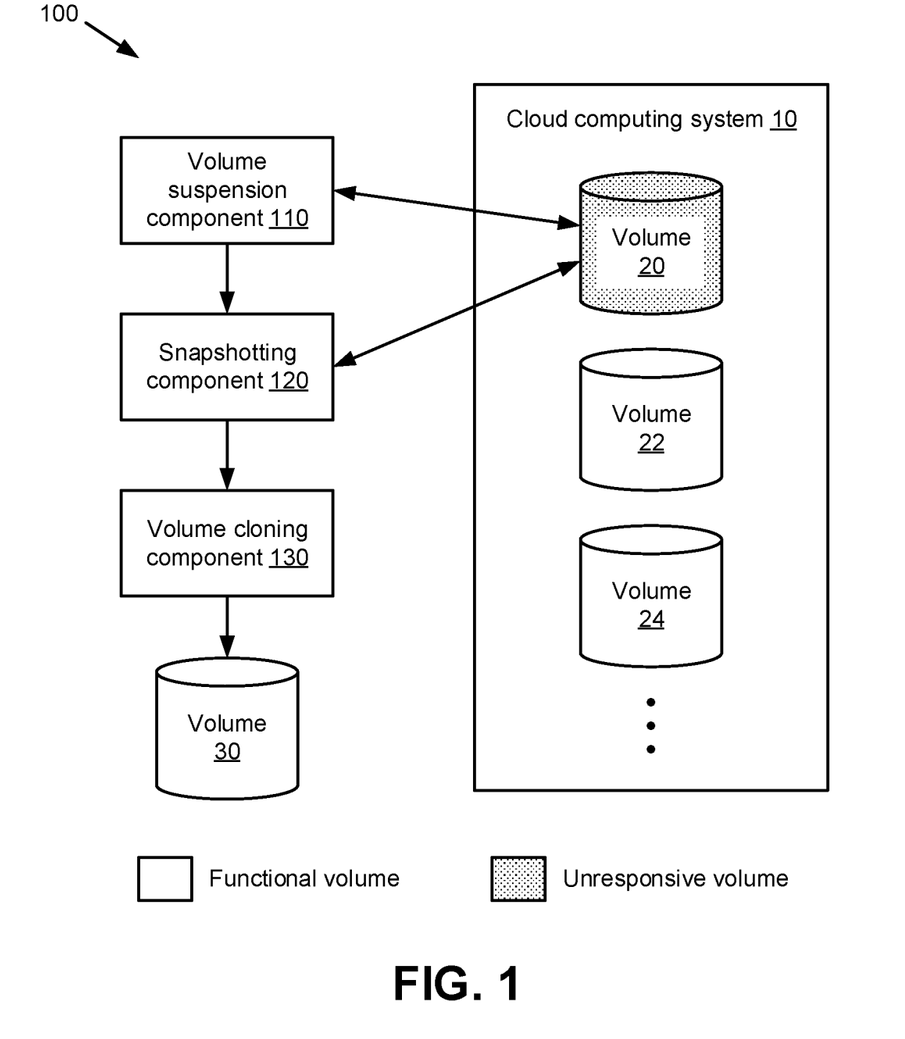
FIGS. 1-4 are block diagrams of respective systems that facilitate volume replacement using cloud volume snapshots in accordance with various implementations described herein.

With reference now to the drawings, FIG. 1 illustrates a block diagram of a system 100 that facilitates volume replacement using cloud volume snapshots in accordance with various implementations described herein. System 100 as shown in FIG. 1 includes a volume suspension component 110, a snapshotting component 120, and a volume cloning component 130, each of which can operate as described in further detail below. In an implementation, the components 110, 120, 130 of system 100 can be implemented in hardware, software, or a combination of hardware and software. By way of example, the components 110, 120, 130 can be implemented as computer-executable components, e.g., components stored on a memory and executed by a processor. Examples of computer architectures including a processor and a memory that can be used to implement the components 110, 120, 130 as well as other components as will be described herein, are shown and described in further detail below with respect to FIG. 11.

Additionally, it is noted that the functionality of the respective components shown and described herein can be implemented via a single computing device and/or a combination of devices. For instance, in various implementations, the volume suspension component 110 shown in FIG. 1 could be implemented via a first device, the snapshotting component 120 could be implemented via the first device or a second device, and the volume cloning component 130 could be implemented via the first device, the second device, or a third device. Also, or alternatively, the functionality of a single component could be divided among multiple devices in some implementations.

As shown in FIG. 1, the components 110, 120, 130 can be utilized to manage volumes 20, 22, 24 associated with a cloud computing system 10. In implementations, the cloud computing system 10 can utilize a distributed clustered file system, in which one or more volumes 20, 22, 24 used for file system storage are attached to respective virtual machines (VMs) that provide computing functionality for the cloud computing system 10. Respective VMs associated with the cloud computing system 10 can be similarly configured, e.g., in terms of processing power, memory amount, number of attached volumes, and/or other criteria. Additionally, VMs associated with a given cluster can be interconnected through backend networking, enabling the VMs of the cluster to communicate with each other. An example system for attaching a storage volume 20, 22, 24 to a VM is described in further detail below with respect to FIG. 3.

In an implementation, one or more of the components 110, 120, 130 of system 100 can be implemented via an orchestration engine that resides outside of any clusters associated with the cloud computing system 10 and assists in driving any orchestration associated with the cloud computing system 10. Orchestration tasks that can be performed by the orchestration engine can include, for example, life-cycle management, self-healing, and/or any other actions that are desirably taken on a cluster of the cloud computing system 10, e.g., via a platform application programming interface (Platform API or PAPI), and/or a cloud provider associated with the cloud computing system, e.g., via Cloud APIs. As used herein, e.g., with respect to FIGS. 5-8 below, a computing device on which the orchestration engine and/or any components thereof can reside is referred to as an "orchestration device." Accordingly, system 100 can be composed of one or more orchestration devices, each of which can implement one or more of the components 110, 120, 130, and/or other suitable components as will be described in further detail below.

In implementations, the volumes 20, 22, 24 of the cloud computing system 10 as shown in FIG. 1 can be physical storage devices (e.g., drives) or virtual storage devices that are composed of one or more physical storage devices. In an implementation in which the volumes 20, 22, 24 are logical devices, a given volume 20, 22, 24 as shown in FIG. 1 can be composed of one or more physical drives, or portions (stripes, sectors, partitions, etc.) of one or more physical drives, that are operated by the cloud computing system 10 as a single storage device. Thus, from the perspective of system 100, each of the volumes 20, 22, 24 of the cloud computing system 10 can be managed as though they are different physical storage devices, such as Peripheral Component Interconnect (PCI) devices or the like. For this reason, the terms "volume" and "drive" (referring to a logical drive, unless stated otherwise) are used in this description interchangeably.

While FIG. 1 illustrates direct communication between elements of system 100 and a volume 20 of the cloud computing system 10, it is noted that, in some implementations, system 100 can communicate with a cloud provider or other entity associated with the cloud computing system 10 instead of individual volumes or other devices of the cloud computing system 10. This can be done, for example, to provide abstraction for the physical composition of the cloud computing system 10 and simplify operation of system 100 and/or other computing devices that interact with the cloud computing system 10. By way of example, while each volume 20, 22, 24 in the cloud computing system may be composed of multiple physical devices that are each attached to respective VMs as described above, the cloud computing system 10 can nonetheless represent each volume 20, 22, 24 as a single device in order to enable system 100 to run a file system and/or associated applications on the cloud volumes 20, 22, 24 irrespective of the physical configurations of those volumes 20, 22, 24.

As part of supporting cloud services via the cloud computing system 10, system 100 can provide techniques for automating the replacement of a remote drive or volume, e.g., a cloud volume 20, 22, 24, in response to a failure of the volume. As used herein, the term "failure" of a cloud volume 20, 22, 24 refers to both failure of the underlying hardware as well as other circumstances in which a volume 20, 22, 24 is no longer suitable for file system usage, e.g., due to drive stalls, network issues, slow network access, and/or other issues that render a volume 20, 22, 24 unresponsive from the perspective of system 100, both of which would result in a loss of access to the failed volume 20, 22, 24 via a cloud provider or other entity associated with the cloud computing system 10.

Conventional processes for recovering from a drive or volume failure generally involve a re-protection procedure for data stored on the failed drive before the failed drive can be replaced. Once the re-protection procedure has completed and the failed drive or volume has been swapped out, the new drive can be added to the file system and a background job to rebalance system data across that drive can occur, e.g., such that a similar amount of data is stored on all of the system drives, including the new drive, after the rebalance occurs. This process can be extremely time consuming, e.g., typically ranging from several hours to multiple days depending on the amount of data stored on the failed drive, the available system computing resources for drive replacement, and other factors, during which the system can expend CPU cycles and/or other resources that could otherwise be used to perform other tasks. Additionally, drive replacement jobs are sometimes configured as low priority or background jobs on client systems, which can further extend the amount of time taken by such processes. Moreover, during re-protection, the system could experience data unavailability or data loss in the event that additional drives or volumes fail.

In view of at least the foregoing, various implementations described herein can leverage tools available via the cloud computing system 10 to help automate and enhance the drive replacement process. Using functionality such as creating snapshots of existing volumes, spinning up new volumes based on snapshots, and hot swapping PCI devices for VMs, implementations described herein can facilitate a workflow that allows for the replacement of volumes without the use of the re-protection and rebalance jobs associated with a standard drive replacement process as described above.

By enabling the replacement of an unresponsive volume without waiting for re-protection or rebalancing jobs to complete, the implementations described herein can provide several advantages that can improve the performance of a computing system, e.g., a computing system that utilizes services provided via a cloud computing system 10. These advantages can include, but are not limited to, the following. The specified storage capacity of a computing system, e.g., as provided in a service level agreement to a cloud computing client, can be restored significantly faster following a volume failure. Resiliency of the system to data loss can be increased by decreasing the amount of time a failed drive is unavailable, thereby reducing the window during which the system is vulnerable to data loss due to additional volume failures. The efficiency of a cloud computing deployment for serving client load, e.g., in terms of processor cycles or other computing resources, can be increased following a drive failure. Other advantages are also possible.

With respect now to the components 110, 120, 130 of system 100 shown in FIG. 1, the volume suspension component 110 can suspend input/output (I/O) operations to a first volume 20 of a cloud computing system 10 in response to the first volume 20 being determined to have failed or otherwise become unresponsive. As noted above, the term "failure" refers both to physical failure of the underlying hardware as well as a network or communication failure between system 100 and the cloud computing system 10. Techniques by which failure detection for cloud volumes can be performed are described in further detail below with respect to FIGS. 4-7.

In general, once a volume can no longer be used by the file system, the volume suspension component 110 can, instead of triggering a re-protection procedure, suspend the volume and then indicate to the orchestration engine, e.g., via the snapshotting component 120 as will be described below, that a drive replacement workflow is to be started. By suspending I/O activity to a given unresponsive volume 20, system 100 can ensure that all writes designated for the volume 20 either have been completed or have been journaled or otherwise stored so that the writes can be initiated when the volume 20 returns.

In response to the volume suspension component 110 suspending I/O operations to the volume 20, the snapshotting component 120 can initiate creation of a replacement volume by capturing a snapshot of the volume 20. Using this snapshot of the volume 20, the volume cloning component 130 can then create a new volume 30, distinct from the failed volume 20, for use by the cloud computing system 10. This new volume 30 can then be added to the cloud computing system 10 in place of the failed volume 20, e.g., as described in further detail below with respect to FIG. 2.

In an implementation, operation of the snapshotting component 120 can begin by checking the drive state of the failed volume 20 and confirm that it has been marked as suspended by the volume suspension component 110. Once the drive has been suspended, the snapshotting component 120 can proceed under an assumption that all outstanding I/O operations for the volume have been flushed and that no incoming writes are targeted for the volume, and that any outstanding I/O operations were either flushed to the disk or kept in the journal until the disk returns.

To generate a snapshot of the failed volume 20, the snapshotting component 120 can obtain a volume identifier for the failed volume 20 and create a snapshot for the volume based on that identifier. This process can generate a snapshot identifier, which can then be used by the volume cloning component 130 to create a replacement volume 30. In general, a snapshot generated by the snapshotting component 120 can capture a current state of the failed volume 20 to facilitate reuse of that drive state, e.g., for a new volume 30. It is noted again that the definition of a "failed" drive or volume as used herein refers to a drive or volume that has become unresponsive to system 100, irrespective of the actual cause of the unresponsiveness. This definition is used because system 100 will, in some implementations, have limited or no information from the cloud computing system 10 as to the cause of a given drive or volume becoming unresponsive. As a result, the snapshotting component 120 can, in implementations, still successfully facilitate snapshot capture for an unresponsive drive or volume provided that the physical drive hardware associated with the unresponsive drive or volume has not failed to an extent that prohibits snapshot capture. In the event of a physical drive failure, other recovery techniques, such as a conventional re-protection and rebalancing process, could be used. Additionally, a combination of a snapshot-based approach and a conventional drive replacement process could be used, e.g., where a physical drive failure prevents some, but not all, of the data stored by a failed drive from being successfully read.

Figure 2:
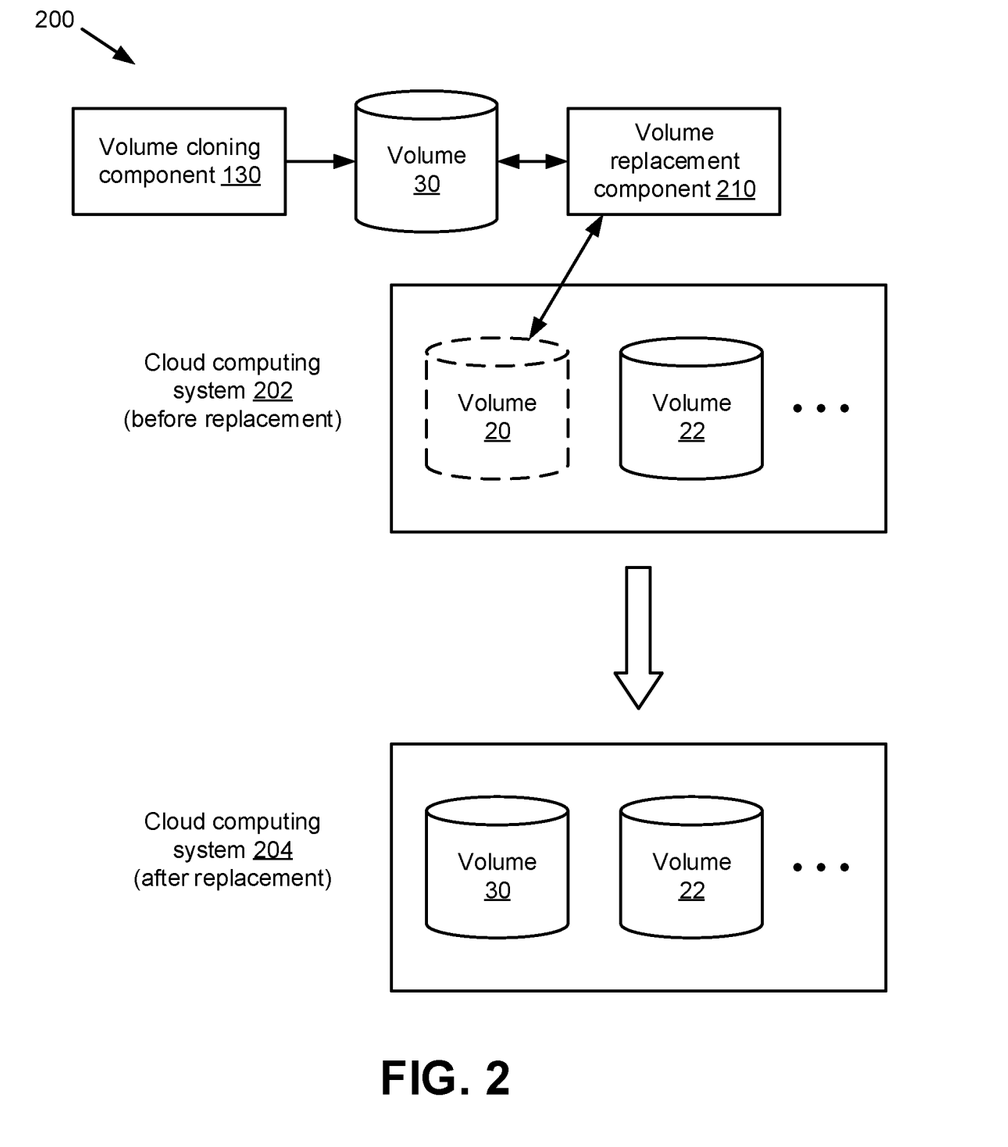

Turning next to FIG. 2, a system 200 that facilitates replacement of a failed volume 20 of a cloud computing system 202, 204 with a replacement volume 30 is illustrated. System 200 as shown in FIG. 2 includes a volume cloning component 130 that can create a replacement volume 30 for a failed volume 20 based on snapshot data associated with the failed volume 20, e.g., as described above with respect to FIG. 1. System 200 further includes a volume replacement component 210 that can replace the original, failed volume 20, as shown in the cloud computing system 202 prior to replacement, with the new volume 30, as shown the cloud computing system 204 after replacement, in response to the volume cloning component 130 creating the new volume 30.

In the example shown by FIG. 2, because suspending I/O operations to the failed volume 20 (e.g., as described above with respect to FIG. 1 via the volume suspension component 110) results in the failed volume 20 being consistent with the file system of the cloud computing system 202/204, the volume replacement component 210 can add the new volume 30, having the same contents as the failed volume 20, into the file system of the cloud computing system 202/204 without any issues. To further facilitate replacing the failed volume 20 with a new volume 30, the orchestration engine associated with system 200, e.g., via the volume cloning component 130, can determine, based on its inventory of the cluster, which type and size of volume to create as parameters for the replacement volume 30. Once the new volume 30 that matches the characteristics of the failed volume 20 (e.g., in capacity, size, etc.) has been created from a snapshot of the failed volume 20, the new volume 30 can be added to the file system, and the failed volume can be removed from the file system, as shown in FIG. 2.

As noted above, the volume replacement component 210 as shown in FIG. 2 can facilitate an in-place replacement of a failed volume 20 with a new volume 30 without the need for costly procedures such as a re-protection or rebalancing job. Thus, the volume replacement component 210 can facilitate addition of a new volume into the cloud computing system 202/204 without altering the contents of any other volume(s) of the cloud computing system 202/204, such as volume 22 shown in FIG. 2, aside from the failed volume 20 and/or the new volume 30.

Figure 3:
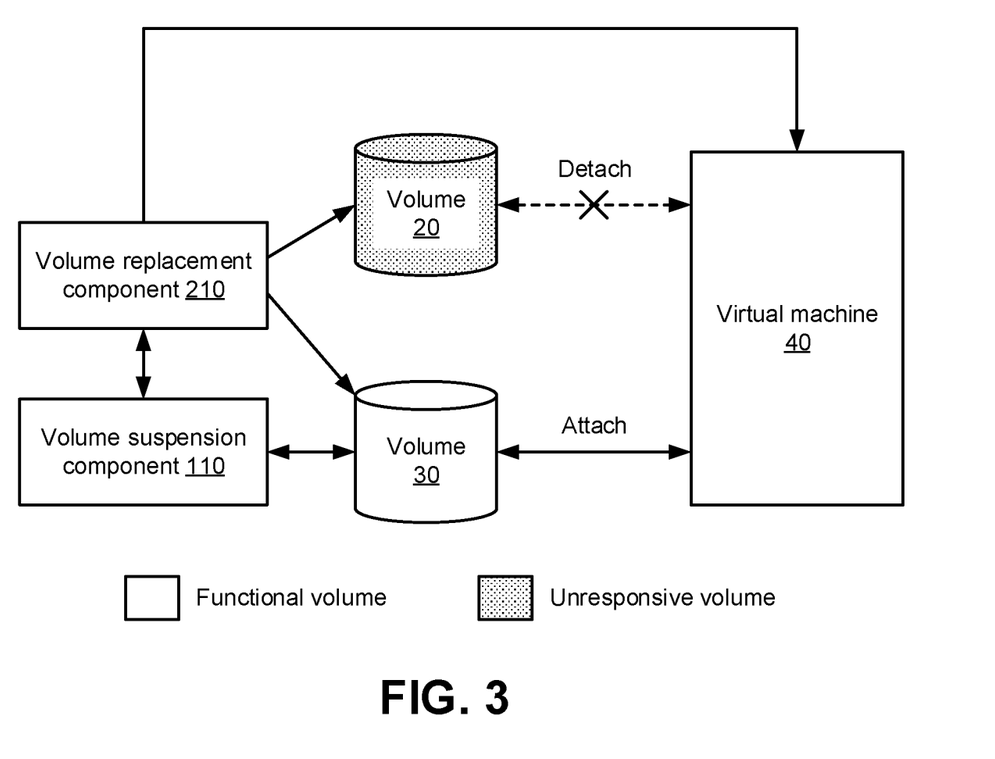

Turning next to FIG. 3, operations that can be performed by the volume replacement component 210 to facilitate replacing a failed/unreachable volume 20 with a new volume 30 are illustrated in further detail. As shown in FIG. 3, once a new volume 30 that matches the characteristics of an original volume 20 has been created from a snapshot of the original volume 20, the volume replacement component 210 can detach the original volume 20 from a VM 40, e.g., a VM 40 in a cloud computing system 10 (not shown in FIG. 3) to which the original volume 20 is attached, and subsequently attach the new volume 30 to the VM 40 in place of the original volume 20.

Once the replacement volume 30 has been attached to the VM 40, the new volume 30 can be unsuspended, e.g., by instructing an associated Platform API to add the volume to the system. As a result of unsuspending the new volume 30, I/O operations and/or activity targeting the new volume 30 can resume. Additionally, as part of re-adding the volume 30 to the file system, the volume replacement component 210 can ensure that metadata related to the volume is consistent now that a new, but identical to the failed, volume has been introduced. Updating the relevant metadata can include, e.g., updating any serialization (e.g., serial number, world wide name (WWN), etc.) that is tracked as part of inventory, and/or any other suitable operations. Once all metadata has been updated, the volume replacement component 210 can complete the drive addition. Subsequently, once the new volume 30 has been confirmed to have been successfully added to the filesystem, the volume replacement component 210 can complete the replacement process by deleting the failed volume 20.

Figure 4:
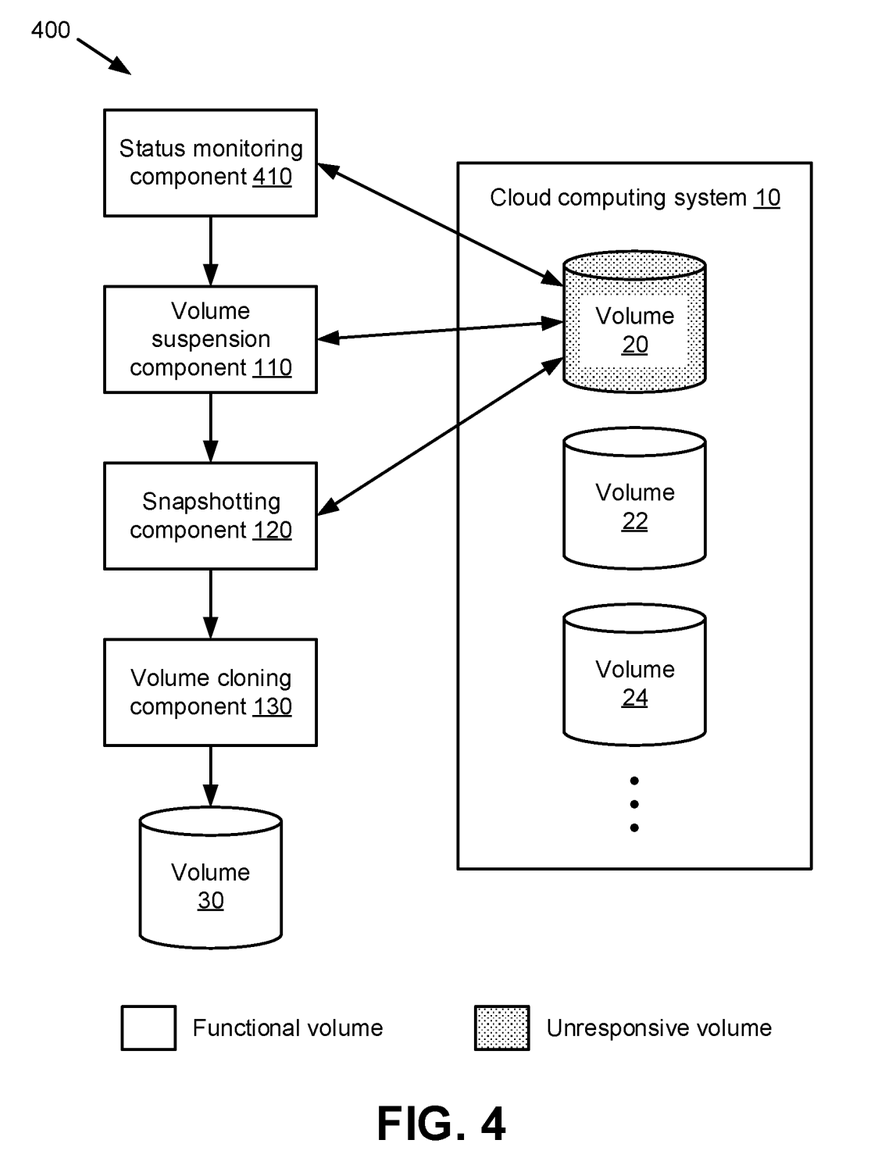

With reference next to FIG. 4, a block diagram of another system 400 that facilitates volume replacement using cloud volume snapshots is illustrated. Repetitive description of like parts described above with regard to other implementations is omitted for brevity. System 400 as shown in FIG. 4 includes a volume suspension component 110, snapshotting component 120, and volume cloning component 130, each of which can operate in a similar manner to that described above with respect to FIG. 1. System 400 as shown in FIG. 4 further includes a status monitoring component 410 that can monitor the health of the volumes 20, 22, 24 of an associated cloud computing system 10, e.g., to identify volumes that have become unresponsive. For instance, in the example shown in FIG. 4, the status monitoring component 410 can determine that a given volume 20 has become unresponsive in response to determining that network connectivity to that volume 20 has been lost, and/or in response to other similar events.

In an implementation, the status monitoring component 410 can be implemented as a daemon that runs in the file system of the cloud computing system 10 and handles drive state. Upon determining that a volume is no longer suitable for use, the daemon can mark the volume as failed, which can then enable the volume suspension component 110 to place the volume in a suspended state, e.g., instead of performing a re-protection and rebalancing procedure.

Referring next to FIGS. 5-8, a messaging flow diagram illustrating respective stages of a process 500 for volume replacement using cloud volume snapshots is provided. In particular, FIGS. 5-8 show operations that can be performed by respective elements of a cloud computing infrastructure, including an orchestration device 50 (e.g., on which system 100 and/or other systems as described herein could be implemented), a cloud provider API 52 that provides access to a cloud service, a cloud computing cluster 54 that includes VMs and/or other real or virtual devices on which the cloud service is implemented, a volume 56 associated with the cloud service (e.g., a failed volume 20 as described above with respect to FIG. 1), and a new volume 58 (e.g., a replacement volume 30 as described above with respect to FIG. 1). Additionally, while various operations shown in FIGS. 5-8 are described relative to points in time, it is noted that the process 500 described herein is not necessarily limited by the relative timing of operations shown in FIGS. 5-8, as depending on implementation some operations could occur simultaneously and/or in a different order than what is illustrated.

Figure 5:
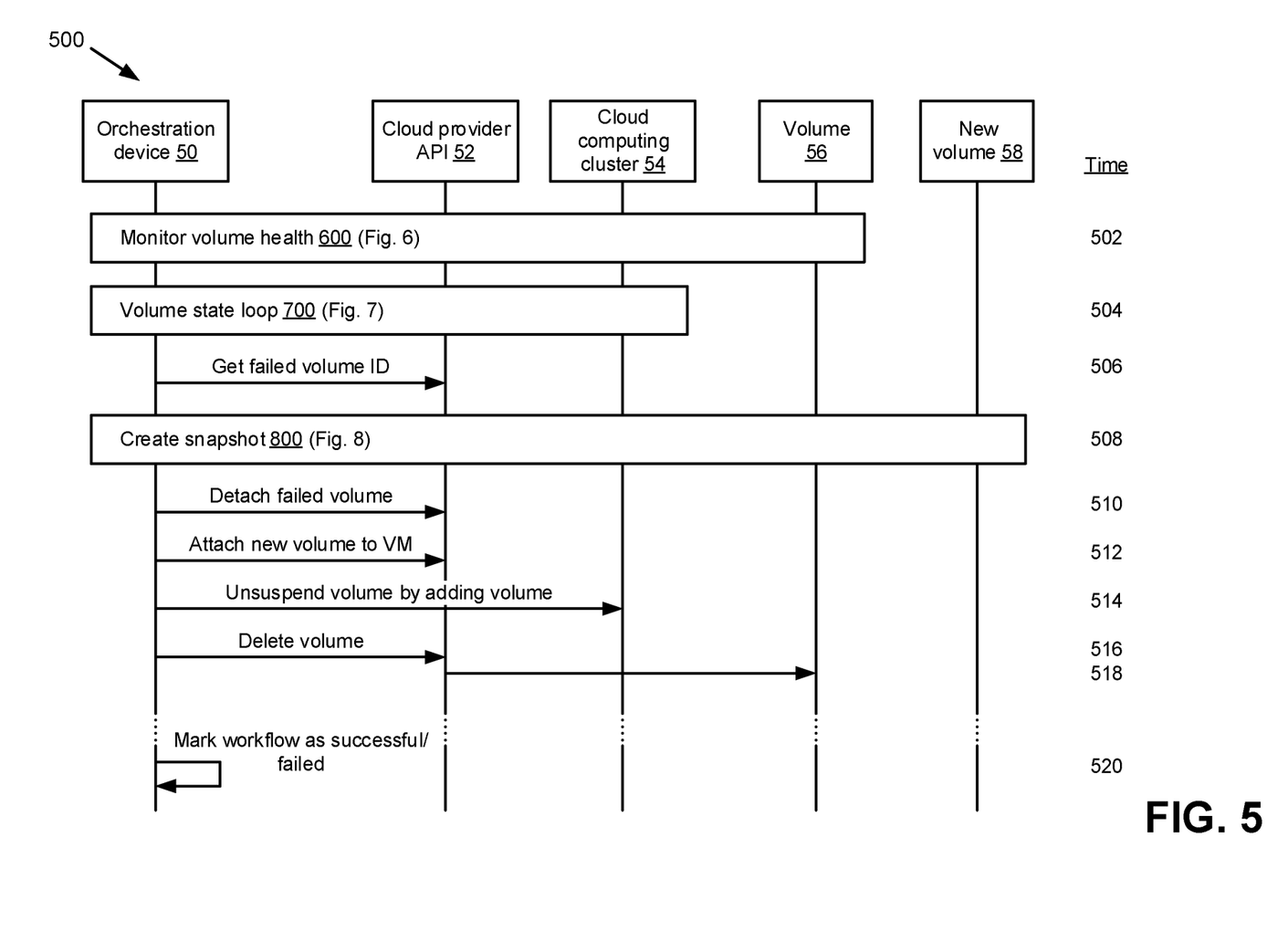
FIGS. 5-8 are messaging flow diagrams depicting respective executable routines of a process to facilitate volume replacement using cloud volume snapshots in accordance with various implementations described herein.
Figure 6:
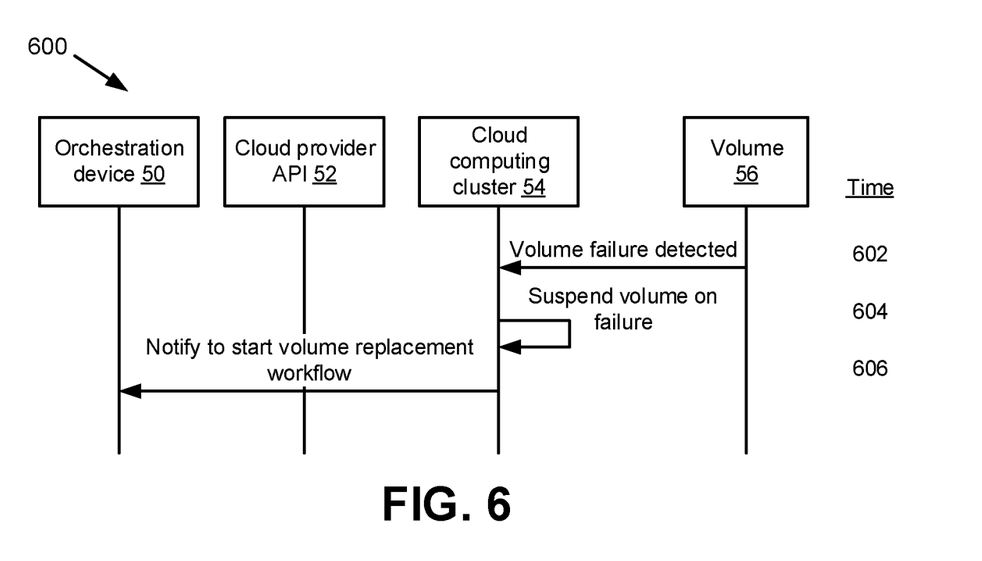

Process 500 as shown in FIG. 5 begins at time 502, in which a volume health monitoring procedure 600 is conducted for the volume 56 by the orchestration device 50. Referring to FIG. 6, and with further reference to FIG. 5, the volume health monitoring procedure 600 can facilitate monitoring the health and/or availability of the volume 56 until a failure event (e.g., a communication or network failure, a device failure, etc.) associated with the volume 56 is detected at time 602 by the cloud computing cluster 54. In response to detecting the failure event, the cloud computing cluster can suspend the volume 56 at time 604. Suspending the volume 56 at time 604 can remove it from file system usage as well as ensure that no outstanding I/O is pending on the volume 56, e.g., due to the volume 56 being marked as absent. The cloud computing cluster 54 can then notify the orchestration device 50 to start the volume replacement workflow at time 606.

Figure 7:
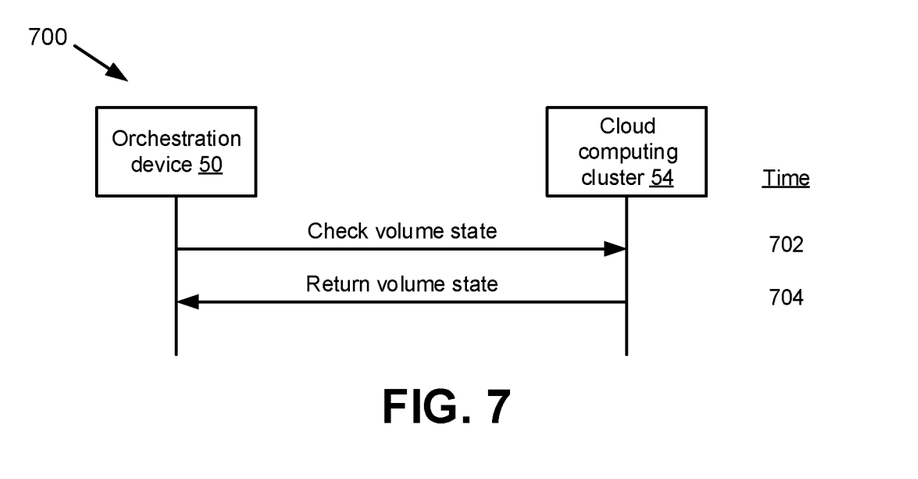

Returning to FIG. 5, in the event that the volume health monitoring procedure 600 detects a failure of the volume 56, process 500 can proceed from the volume health monitoring procedure 600 to a volume state loop 700 at time 504, which is shown by FIG. 7. During the volume state loop 700 as shown in FIG. 7, the orchestration device 50 can check the state of the volume 56 via the cloud computing cluster 54 at time 702, and the cloud computing cluster 54 can return the state of the volume 56 to the orchestration device 50 at time 704. The volume state loop 700 shown by FIG. 7 can repeat until the volume 56 is marked as suspended, at which time the volume state loop 700 concludes.

Figure 8:
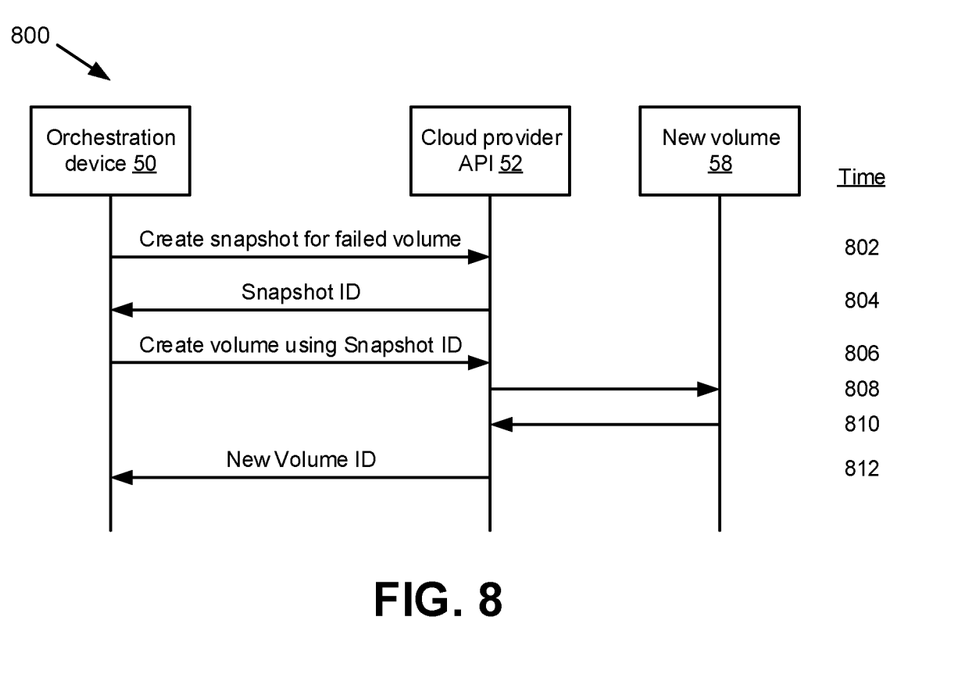

With reference again to FIG. 5, following completion of the volume state loop 700 at time 504, the orchestration device 50 can obtain the ID of the failed volume 56 from the cloud provider API 52 at time 506. Subsequently, the orchestration device 50 can enter a snapshot creation procedure 800 at time 508, which is shown by FIG. 8. The snapshot creation procedure 800 shown in FIG. 8 begins at time 802, in which the orchestration device 50 creates a snapshot for the failed volume 56 via the cloud provider API 52. Upon successful creation of the snapshot at time 802, the cloud provider API 52 can return a snapshot ID associated with the snapshot to the orchestration device 50 at time 804, and the orchestration device 50 can instruct the cloud provider API 52 to create a new volume 58 using the snapshot ID at time 806. The procedure of creating the new volume 58 can include allocating the new volume 58, e.g., at time 808, and confirmation of successful volume creation to the cloud provider API 52 at time 810. At time 812, the cloud provider API 52 can return an ID associated with the new volume 58 to the orchestration device 50, and the snapshot creation procedure 800 can conclude.

As a result of successful completion of the snapshot creation procedure 800 shown in FIG. 8, the new volume 58 can be created as a clone of the original volume 56, e.g., with substantially identical contents, size, and/or other properties as the original volume 56. If creation of the snapshot and/or new volume 58 fails at any point during the snapshot creation procedure 800, execution of the process 500 can be halted, the workflow can be marked as failed, and the orchestration device 50 can prompt a user for manual intervention.

Returning again to FIG. 5, upon successful completion of the snapshot creation procedure 800 at time 508, process 500 can continue to time 510, in which the orchestration device 50 can detach the failed volume 56 from the cloud file system, e.g., by facilitating the detachment of the failed volume 56 from an associated VM via the cloud provider API 52 in a similar manner to that described above with respect to FIG. 3. Next, at 512, the orchestration device 50 can attach the new volume 58 to the associated VM from which the failed volume 56 was attached, or another VM, via another request to the cloud provider API 52.

At time 514, subsequent to the new volume 58 being attached to the VM, the new volume 58 can be added to the cloud computing cluster 54 by the orchestration device 50, and I/O operations to the new volume 58 can be restored (unsuspended). The orchestration device 50 can then instruct the cloud provider API 52 to delete the original volume 56 at time 516, and the cloud provider API 52 can carry out this request at time 518.

Upon conclusion of all actions shown at times 502-518, or in response to a failure of any of the illustrated actions, the workflow can conclude at time 520, and the status of the workflow (e.g., success or failure) can be indicated via the orchestration device 50. In the event that any manual actions are to be taken following time 520 (e.g., due to a failure of the snapshot creation procedure 800 and/or for other reasons), the orchestration device 50 can prompt a user to perform these actions at this time.

As a result of the workflow shown by FIGS. 5-8, the volume 58 that was swapped in can be made to appear identical to the volume 56 that was deemed failed. As a result, the failed volume 56 can be replaced while requiring neither a re-protection procedure nor a subsequent rebalance after the replacement volume 58 has been added to the file system. This can be of particular benefit in cloud deployments, e.g., due to the I/O budget provided by each VM. Instead of having to use a portion of the I/O budget of a VM to perform a re-protect and rebalancing, the system can be brought back to operational status, and full VM capability can be leveraged, in a shorter amount of time. Additionally, the workflow shown by FIGS. 5-8 can reduce the window of risk of data unavailability and data loss (DU/DL) due to multiple concurrent volume failures, as the amount of time any given system volume is down due to failure can be significantly reduced.

Figure 9:
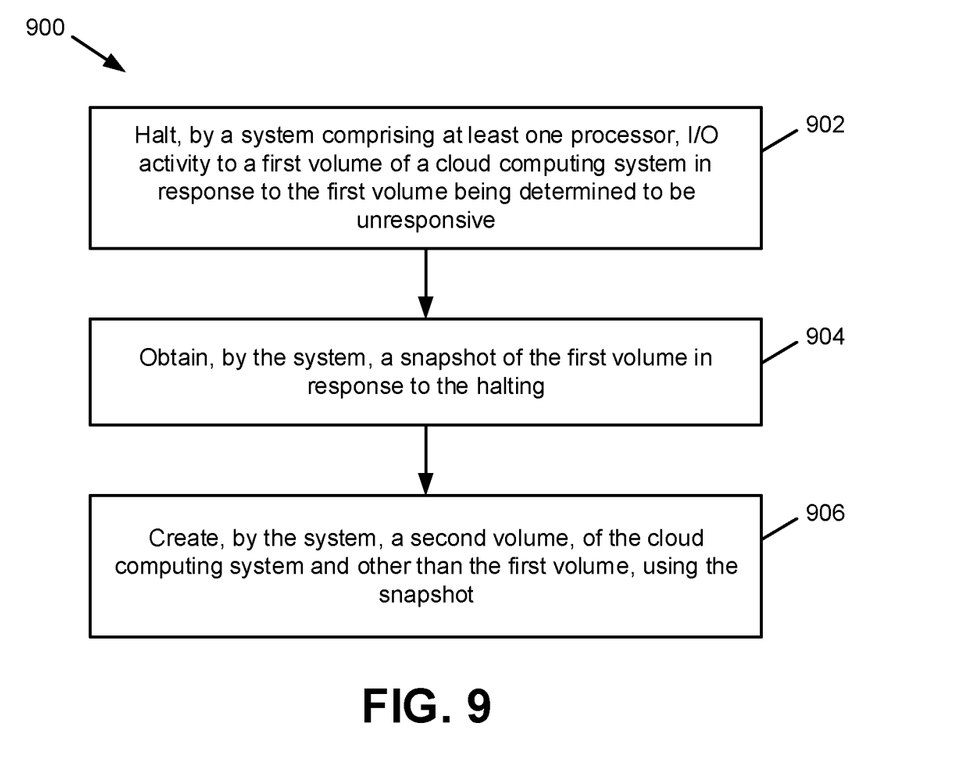
FIG. 9 is a flow diagram of a method that facilitates volume replacement using cloud volume snapshots in accordance with various implementations described herein.

Turning to FIG. 9, a flow diagram of a method 900 that facilitates volume replacement using cloud volume snapshots is illustrated. At 902, a system comprising a processor can halt (e.g., by a volume suspension component 110) I/O activity to a first volume (e.g., a volume 20) of a cloud computing system (e.g., a cloud computing system 10) in response to the first volume being determined to be unresponsive.

At 904, the system can obtain (e.g., by a snapshotting component 120) a snapshot of the first volume in response to I/O activity to the first volume being halted at 902.

At 906, the system can create (e.g., by a volume cloning component 906) a second volume (e.g., a volume 30), of the cloud computing system and other than the first volume, using the snapshot obtained at 904.

Figure 10:
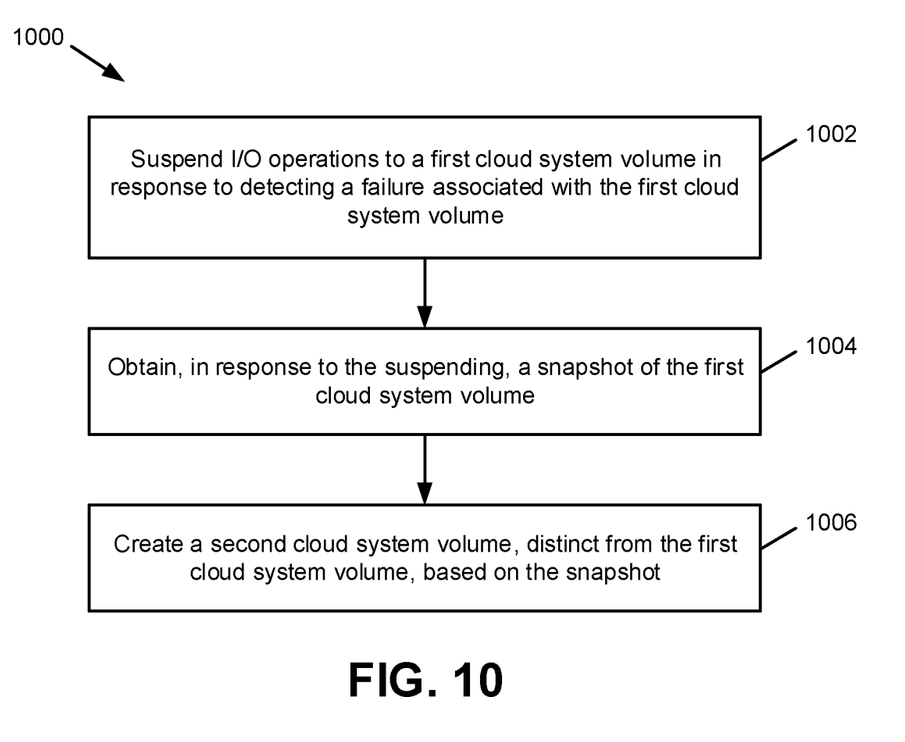
FIG. 10 is a flow diagram depicting respective operations facilitating volume replacement using cloud volume snapshots that can performed by a processor in accordance with various implementations described herein.

Referring next to FIG. 10, a flow diagram of a method 1000 that can be performed by a processor, e.g., based on machine-executable instructions stored on a non-transitory machine-readable medium, is illustrated. An example of a computer architecture, including a processor and non-transitory media, that can be utilized to implement method 1000 is described below with respect to FIG. 11.

Method 1000 can begin at 1002, in which the processor can suspend I/O operations to a first cloud system volume in response to detecting a failure associated with the first cloud system volume.

At 1004, the processor can obtain, in response to the suspending at 1002, a snapshot of the first cloud system volume.

At 1006, the processor can create a second cloud system volume, distinct form the first cloud system volume, based on the snapshot obtained at 1004.

FIGS. 9-10 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 11:
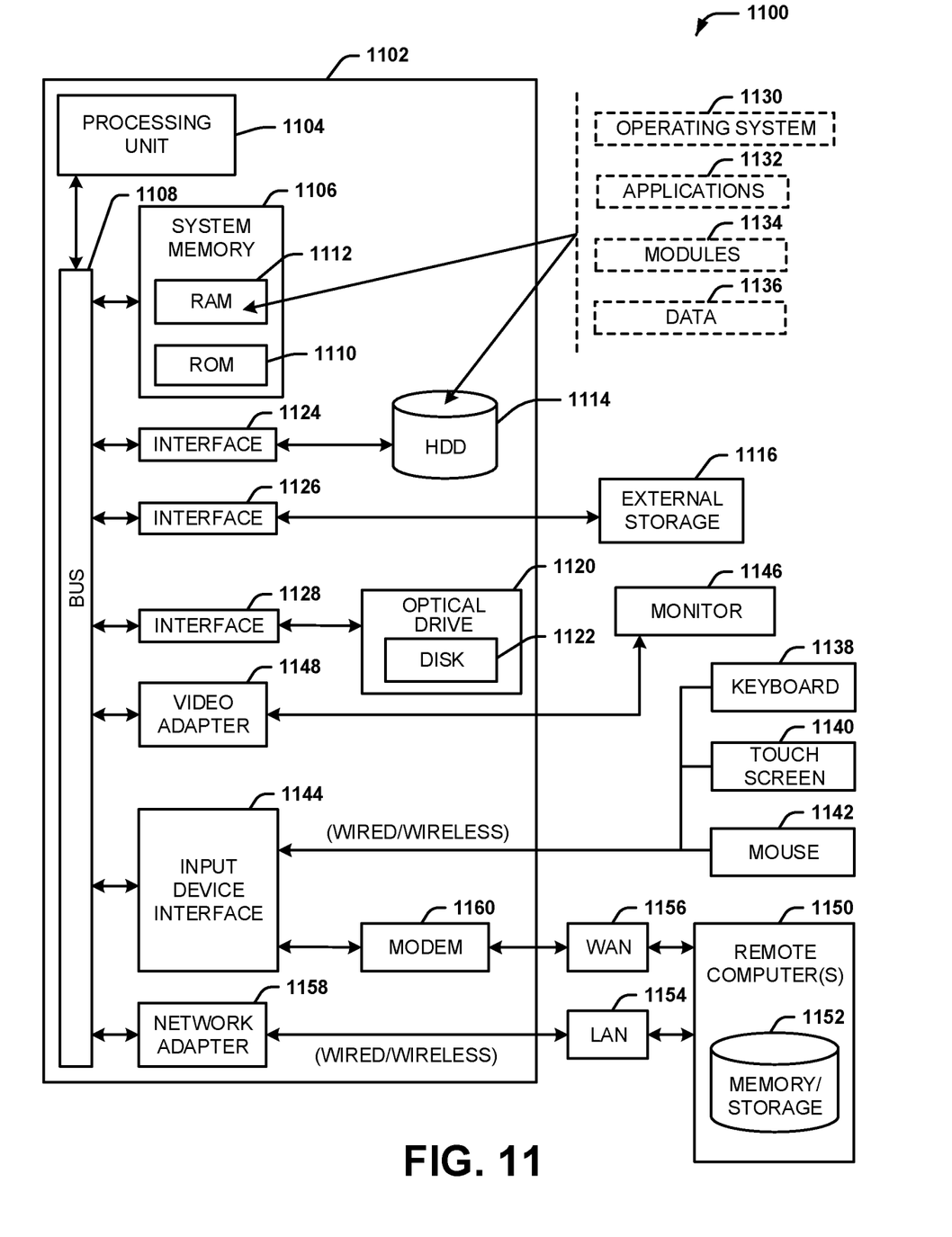
FIG. 11 is a diagram of an example computing environment in which various implementations described herein can function.

In order to provide additional context for various embodiments described herein, FIG. 11 and the following discussion are intended to provide a brief, general description of a suitable computing environment 1100 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference now to FIG. 11, an example general-purpose environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
at least one memory that stores executable components; and
at least one processor that executes the executable components stored in the at least one memory, wherein the executable components comprise:
a volume suspension component that suspends input/output (I/O) operations to a first volume of a cloud computing system in response to the first volume being determined to have become unresponsive, wherein a suspension of the I/O operations by the volume suspension component facilitates completion or storage of respective writes designated for the first volume;
a snapshotting component that captures a snapshot of the first volume in response to the volume suspension component suspending the I/O operations to the first volume; and
a volume cloning component that creates a second volume, of the cloud computing system and not the first volume, using the snapshot of the first volume.

2. The system of claim 1, wherein the executable components further comprise:
a volume replacement component that replaces the first volume of the cloud computing system with the second volume in response to the volume cloning component creating the second volume.

3. The system of claim 2, wherein the volume replacement component replaces the first volume with the second volume by at least detaching the first volume from a virtual machine, of the cloud computing system and associated with the first volume, and attaching the second volume to the virtual machine.

4. The system of claim 3, wherein the volume suspension component resumes the I/O operations to the second volume in response to the second volume being determined to have been successfully attached to the virtual machine.

5. The system of claim 3, wherein the volume replacement component deletes the first volume in response to the second volume being determined to have been successfully attached to the virtual machine.

6. The system of claim 2, wherein the volume replacement component replaces the first volume with the second volume without altering any contents of any other volumes of the cloud computing system, which are not the first volume and the second volume.

7. The system of claim 1, wherein the volume cloning component obtains a volume identifier for the first volume from the cloud computing system and creates the second volume using the volume identifier.

8. The system of claim 1, wherein the executable components further comprise:
a status monitoring component that determines that the first volume has become unresponsive in response to determining that network connectivity to the first volume has been lost.

9. A method, comprising:
halting, by a system comprising at least one processor, input/output (I/O) activity to a first volume of a cloud computing system in response to the first volume being determined to be unreachable, wherein the halting comprise removing the first volume from usage and determining that no I/O activity is pending on the first volume;
based on the halting, obtaining, by the system, a snapshot of the first volume; and
creating, by the system, a second volume, of the cloud computing system and other than the first volume, using the snapshot.

10. The method of claim 9, further comprising:
replacing, by the system, the first volume of the cloud computing system with the second volume in response to the creating being determined to have successfully completed.

11. The method of claim 10, wherein the replacing comprises:
detaching the first volume from a virtual machine, of the cloud computing system and associated with the first volume; and
attaching the second volume to the virtual machine.

12. The method of claim 10, further comprising:
resuming, by the system, the I/O activity to the second volume in response to the replacing being determined to have been successfully completed.

13. The method of claim 10, further comprising:
deleting, by the system, the first volume from the cloud computing system in response to the replacing being determined to have been successfully completed.

14. The system of claim 10, wherein the replacing comprises replacing the first volume of the cloud computing system with the second volume without altering any contents of any other volumes of the cloud computing system, other than the first volume and the second volume.

15. The method of claim 9, further comprising:
determining, by the system, that the first volume has become unreachable in response to detecting a failure in network connectivity to the first volume.

16. A non-transitory machine-readable medium comprising computer executable instructions that, when executed by at least one processor, facilitate performance of operations, the operations comprising:
suspending input/output (I/O) operations to a first cloud system volume in response to detecting a failure associated with the first cloud system volume, wherein the suspending comprises determining that there are no outstanding I/O operations pending on the first cloud system volume;
based on the suspending, obtaining, in response to the suspending, a snapshot of the first cloud system volume; and
creating a second cloud system volume, distinct from and identical to the first cloud system volume, based on the snapshot.

17. The non-transitory machine-readable medium of claim 16, wherein the operations further comprise:
detaching, in response to the creating of the second cloud system volume, the first cloud system volume from a virtual machine associated with the first cloud system volume; and
attaching the second cloud system volume to the virtual machine in place of the first cloud system volume.

18. The non-transitory machine-readable medium of claim 17, wherein the operations further comprise:
in response to the attaching being determined to have been completed:
unsuspending the I/O operations to the second cloud system volume; and
deleting the first cloud system volume.

19. The non-transitory machine-readable medium of claim 16, wherein the operations further comprise:
 replacing the first cloud system volume with the second cloud system volume without altering any contents of any other cloud system volumes, distinct from the first cloud system volume and the second cloud system volume.

20. The non-transitory machine-readable medium of claim 16, wherein the failure associated with the first cloud system volume is a communication failure.

\* \* \* \* \*